United States Patent
Hubans et al.

(10) Patent No.: US 11,320,550 B2
(45) Date of Patent: May 3, 2022

(54) PROCESSING A 4D SEISMIC SIGNAL BASED ON NOISE MODEL

(71) Applicant: Total S.A., Courbevoie (FR)

(72) Inventors: Christian Hubans, Pau (FR); Natalia Shchukina, Pau (FR)

(73) Assignee: TOTAL SE, Courbevoie (FR)

( * ) Notice: Subject to any disclaimer, the term of this patent is extended or adjusted under 35 U.S.C. 154(b) by 0 days.

(21) Appl. No.: 16/647,858

(22) PCT Filed: Sep. 18, 2017

(86) PCT No.: PCT/IB2017/001336
§ 371 (c)(1),
(2) Date: Mar. 16, 2020

(87) PCT Pub. No.: WO2019/053484
PCT Pub. Date: Mar. 21, 2019

(65) Prior Publication Data
US 2020/0217976 A1    Jul. 9, 2020

(51) Int. Cl.
*G01V 1/28* (2006.01)
*G01V 1/30* (2006.01)

(52) U.S. Cl.
CPC .............. *G01V 1/282* (2013.01); *G01V 1/306* (2013.01); *G01V 1/308* (2013.01); *G01V 2210/34* (2013.01)

(58) Field of Classification Search
CPC ........ G01V 1/282; G01V 1/306; G01V 1/308; G01V 2210/34
See application file for complete search history.

(56) References Cited

U.S. PATENT DOCUMENTS

| | | | | |
|---|---|---|---|---|
| 6,574,563 B1* | 6/2003 | Nickel | ..................... | G01V 1/28 |
| | | | | 702/14 |
| 7,908,086 B2* | 3/2011 | Bergery | ................. | G01V 1/364 |
| | | | | 702/14 |
| 8,219,320 B2* | 7/2012 | Saenger | ................... | G01V 1/30 |
| | | | | 702/14 |
| 9,835,743 B2* | 12/2017 | Wibaux | ................ | G01V 1/008 |
| 2010/0302905 A1* | 12/2010 | Meunier | ................ | G01V 1/366 |
| | | | | 367/42 |

(Continued)

OTHER PUBLICATIONS

International Search Report for International App. No. PCT/IB2017/001336, dated Jun. 19, 2018, in 4 pages.

(Continued)

*Primary Examiner* — Raymond L Nimox
(74) *Attorney, Agent, or Firm* — Knobbe Martens Olson & Bear, LLP (57) ABSTRACT

The invention notably relates to a computer-implemented method for processing a 4D seismic signal relative to a subsoil, the subsoil including a zone subject to extraction and/or injection, the method comprising: providing the 4D seismic signal; identifying a part of the 4D seismic signal corresponding to a zone of the subsoil distinct from the zone subject to extraction and/or injection; determining a noise model of the 4D seismic signal based on the identified part of the 4D seismic signal; and processing the 4D seismic signal based on the noise model. This improves the field of 4D seismic data processing.

20 Claims, 4 Drawing Sheets

(56) References Cited

U.S. PATENT DOCUMENTS

| | | | | |
|---|---|---|---|---|
| 2011/0218737 A1* | 9/2011 | Gulati | ............. | G06T 15/00 |
| | | | | 702/16 |
| 2011/0295510 A1* | 12/2011 | Gulati | ............. | G01V 1/288 |
| | | | | 702/16 |
| 2016/0320507 A1 | 11/2016 | Kashubin et al. | | |
| 2017/0199290 A1* | 7/2017 | Roux | ............. | G01V 1/366 |

OTHER PUBLICATIONS

Souza, Rafael, et al. "Estimation of reservoir fluid saturation from 4D seismic data: effects of noise on seismic amplitude and impedance attributes," Journal of Geophysics and Engineering. vol. 14 No. 1, (2017), pp. 51-68.

Leguijt, Jaap, et al. "A 4D Noise model used in probabilistic seismic inversion," SEG Technical Program Expanded Abstracts (2013), pp. 3262-3266.

Saint Andre, Cyril, et al. "Innovative QCs for more effective 4D processing," SEG Las Vegas 2012 Annual Meeting (2012), in 5 pages.

Blanco, B., et al. "4D Seismic Processing Pilot, Offshore Qatar," Abu Dhabi International Petroleum Exhibition and Conference held in Abu Dhabi, UAE (Nov. 2014), in 8 pages.

* cited by examiner

PROCESSING A 4D SEISMIC SIGNAL BASED ON NOISE MODEL

FIELD OF THE INVENTION

The invention relates to the field of seismic data processing, and more particularly to a computer-implemented method, a computer program and a computer system for processing a 4D seismic signal relative to a subsoil that includes a zone subject to extraction and/or injection, such as a zone subject to production of oil and/or gas or a zone subject to injection of $CO_2$ and/or of drill cuttings.

BACKGROUND 4D seismic data processing relates to techniques that allow monitoring the evolution of a subsoil over a period based on the acquisition of a 3D seismic signal of the subsoil at different times covering the period. This is particularly useful in the context of extraction and/or injection of any type of material out of and/or into a zone of the subsoil, for example oil and/or gas production, $CO_2$ sequestration, or disposal of waste such as drill cuttings. In such a context, 4D seismic data offer an understanding of the impact of production on subsoil evolution and may thus be used, for example, to enhance the process.

There is thus a need to improve the processing of a 4D seismic signal relative to a subsoil.

SUMMARY OF THE INVENTION

It is therefore provided a computer-implemented method for processing a 4D seismic signal relative to a subsoil. The subsoil includes a zone subject to extraction and/or injection. The method comprises providing the 4D seismic signal. The method also comprises identifying a part of the 4D seismic signal corresponding to a zone of the subsoil distinct from the zone subject to extraction and/or injection. The method also comprises determining a noise model of the 4D seismic signal based on the identified part of the 4D seismic signal. The method also comprises processing the 4D seismic signal based on the noise model.

Such a method offers an improved processing of the 4D seismic signal.

Notably, by determining a noise model and processing the 4D seismic signal based on the noise model, the method takes noise into account in the processing of the 4D seismic signal. This allows making a distinction in the 4D seismic signal between data truly representative of subsoil evolution and data merely representative of noise.

Furthermore, thanks to the noise model being determined based on a zone of the subsoil distinct from the zone subject to extraction and/or injection, the method allows determining a relatively accurate noise model. Indeed, the zone based on which the noise model is determined not being subject to extraction and/or injection, information conveyed by the part of the seismic data corresponding to such zone is, relative to the zone subject to extraction and/or injection, less subject to subsoil evolution and thus more informative on noise. Such data is thus particularly appropriate for being exploited to determine the noise model.

The method may comprise one or more of the following:
identifying the part of the 4D seismic signal corresponding to a zone of the subsoil distinct from the zone subject to extraction and/or injection comprises controlling stationarity of the 4D seismic signal across a plurality of input zones of the subsoil distinct from the zone subject to extraction and/or injection;
the zone of the subsoil distinct from the zone subject to extraction and/or injection comprises any one or any combination of input zones each: outside a reservoir, and/or inside a reservoir but outside a zone of production of the reservoir—having at least substantially the same or similar seismic characteristics as the zone subject to extraction and/or injection—having at least substantially the same or a similar depth as the zone subject to extraction and/or injection—having a distance from the zone subject to extraction and/or injection below a predetermined threshold—and/or siding, above and/or under the zone subject to extraction and/or injection;
the noise model corresponds to one or more types of noise;
the one or more types of noise comprise random noise and/or repeatability noise;
determining the noise model comprises cross-representing the 4D seismic signal against at least one parameter with which at least one of the one or more types of noise correlates, the noise model being determined based on the cross-representation;
determining the noise model further comprises determining isocurves of cumulative density relative to the at least one parameter;
determining the noise model comprises: identifying a portion of the domain of the cross-representation for which the 4D seismic signal is statistically significant, and inferring the noise model based on the portion of the domain of the cross-representation for which the 4D seismic signal is statistically significant;
inferring the noise model comprises determining, in the identified portion of the domain of the cross-representation, isocurves of cumulative density relative to the at least one parameter;
inferring the noise model further comprises extending the isocurves;
the isocurves each comprise a horizontal line portion and a linear slope portion;
the at least one parameter is a parameter with which repeatability noise correlates; and/or
the at least one parameter is a variable representative of seismic amplitude at a given time.

It is further provided a computer program comprising instructions for performing the method.

It is further provided a data storage medium having recorded thereon the computer program.

It is further provided a system comprising a processor coupled to a memory, the memory having recorded thereon the computer program.

BRIEF DESCRIPTION OF THE DRAWINGS

Embodiments of the invention will now be described, by way of non-limiting example, and in reference to the accompanying drawings, where.

DETAILED DESCRIPTION OF THE INVENTION

Examples of application of the method where the zone subject to extraction and/or injection is a zone subject to production of oil and/or gas are now discussed.

The subsoil may be any subsoil, for example comprising, consisting or forming a part of one or more hydrocarbon fields, such as oil and/or gas field(s). The subsoil may include a zone subject to production of oil and/or gas. In other words, at least a part of the subsoil undergoes at least one production phase at some time, e.g. with an oil and/or gas production installation located at the (e.g. sea or land) surface above the subsoil and operating on the subsoil.

The 4D seismic signal corresponds as known per se to a set of two or more 3D seismic signals. The 3D seismic signals may each correspond to a respective seismic data acquisition performed at a respective different time. The 4D seismic signal thereby covers a corresponding period. The former (i.e. oldest) 3D seismic signal may be referred to as "base signal" and correspond to "base time", and the one or more latter (i.e. younger) 3D seismic signal(s) may be referred to as "monitor signal(s)" and correspond to "monitor time(s)". The period covered by the 4D seismic signal may thus be the period starting at base time and ending at (e.g. the last) monitor time.

The seismic data acquisitions may be performed in anyway, e.g. using as known per se one or more seismic sources and one or more receivers (e.g. each comprising one or more seismic sensors). The provision of the 4D seismic signal may comprise performing one or more (e.g. the last) of the respective seismic data acquisitions within the method, or alternatively the method comprises no acquisition at all. Each 3D seismic signal not acquired within the method may stem from a seismic data acquisition performed prior to the method and/or by another actor, and the method may comprise retrieving said 3D seismic signal e.g. from a database stored on a memory of the system, and/or receiving said 3D seismic signal e.g. from a distant computer system.

At least two 3D seismic signals of the 4D seismic signal may correspond to seismic data acquisitions separated by a period including or covered by at least a part of the production phase. The production phase may have started before or substantially at base time, or after base time and before at least one monitor time.

The production phase to which a zone of the subsoil is subject may comprise or consist of any operational phase with respect to said zone part of oil and/or gas production. The production phase may for example comprise or consist of preparing and/or assisting oil and/or gas extraction, such as by—e.g. hydraulic—fracturing, and/or injecting a recovery enhancing product—e.g. steam or acid—in a zone of the subsoil, and/or performing oil and/or gas extraction per se. The at least a part of the production phase included in or covered by the 4D seismic signal may be higher than 1 day, 1 week, 1 month or 1 year. The period covered by the 4D seismic signal may be higher than 1 day, 1 week, 1 month, 1 year or 3 years.

The production phase may be ended before at least one monitor time (e.g. the only and/or last monitor time). In such a case, production may or may not be resumed after said at least one monitor time, e.g. based on the result of processing the 4D seismic signal, e.g. with another production phase. Alternatively, the production phase may continue without any substantial interruption throughout the monitor time(s) and beyond, e.g. and be adjusted at (e.g. last) monitor time, e.g. based on the result of processing the 4D seismic signal.

The method may comprise the production phase. Alternatively, the production phase may be performed independently of the method and/or by another actor.

A seismic signal is a data structure representing a distribution of one or more seismic attributes. A seismic attribute is any type of information that relates to one or more seismic data acquisitions performed on the subsoil. In examples, the one or more seismic attributes may comprise one or more raw measurements provided by one or more seismic data acquisitions, e.g. including amplitude, and/or one or more attributes derived from one or more raw measurements provided by one or more seismic data acquisitions, e.g. including amplitude variation throughout several seismic data acquisitions.

The 3D seismic signals correspond to a 3D-space distribution of one or more seismic attributes over the subsoil (e.g. an x,y,z distribution of one or more seismic attributes, where x and y are coordinates in a horizontal plane and z is a coordinate on a vertical line such as depth). Each of the 3D seismic signals may directly represent such a distribution over the subsoil, or alternatively represent a distribution that may be transformed in a distribution over the subsoil (e.g. an x,y,t distribution where t is a time coordinate representing travel time and convertible to depth).

The 3D seismic signals may in examples each comprise or consist of a seismic cube. A seismic cube represents a 3D-space distribution of one or more seismic attributes (e.g. including or consisting of amplitude) over a cuboid that represents the subsoil (e.g. the cuboid being an exact cube or more generally a rectangular parallelepiped). In other words a seismic cube may comprise a plurality of values of amplitude each corresponding to a respective (x,y,z) position of the subsoil. Each such position may be referred to as "seismic point". The 3D seismic signals may in other examples each comprise or consist of a plurality of traces convertible to such a seismic cube.

The 4D seismic signal represents evolution throughout the period of 3D seismic signals corresponding to one or more of seismic attributes, e.g. from base time to monitor time(s). Each datum of the 4D seismic signal represents evolution of values of one or more of the seismic attributes at corresponding coordinates of the 3D seismic signals. The evolution representation and/or the coordinate correspondence may be performed in any way known from the field of 4D seismic data processing.

In examples, the 4D seismic signal may comprise the 3D seismic signals provided as such. Alternatively or additionally, the 4D seismic signal may comprise a derivative of the 3D seismic signals. In examples, the 4D seismic signal may comprise one or more differences between the 3D seismic signals. In examples, the 3D seismic signals may comprise or consist of seismic cubes. In examples, the 4D seismic signal may comprise or consist of one or more seismic cubes. In such examples, the one or more seismic cubes may comprise a base seismic cube representing a 3D-space distribution of amplitude at base time and one or more monitor seismic cubes each representing a 3D-space distribution of amplitude at a respective monitor time and/or a 3D-space distribution of amplitude variation between base time and a respective monitor time. Amplitude variation may consist of a difference between base amplitude and monitor amplitude, for example the absolute value of the Euclidian difference between base amplitude and monitor amplitude (also referred to as "absolute 4D amplitude").

The processing of the 4D seismic signal may comprise any dataflow and/or workflow that uses the 4D seismic signal, for example to perform an analysis (e.g. a geological and/or production analysis) and/or to perform any preparation for such an analysis.

The analysis may comprise determining information representing evolution of the subsoil, e.g. during the period covered by the 4D seismic signal. The information representing evolution of the subsoil may include information relative to geometrical evolution of geological structures. The geological structures may include in examples one or more reservoirs, one or more horizons, one or more unconformities, one or more intrusions, one or more channels, one or more salt diapirisms, one or more folds, one or more fault, and/or one or more zones related to steam presence (such as front surfaces thereof). The information representing evolution of the subsoil may alternatively or additionally include information relative to physical evolution of geological properties. The geological properties may include in examples elasticity, porosity, permeability, density and/or facies. The analysis may for example comprise monitoring caprock integrity.

The analysis may comprise making a hypothesis with respect to oil and/or gas production, for example based on the determined information representing evolution of the subsoil. The hypothesis may for example provide information relative to quantity, production rate, quality (e.g. oil and/or gas ratio), viscosity, accessibility and/or origin location in subsoil of hydrocarbon already produced or still in the subsoil. Said information may correspond to a time or a period covered by the 4D seismic signal. Alternatively, said information may correspond to a time or to a period uncovered by the 4D seismic signal. In the latter case, the hypothesis making may comprise an extrapolation in order to determine said information. In case the extrapolation falls after the period covered by the 4D seismic signal, the hypothesis may constitute a prediction.

The method may comprise making and optionally then executing a decision related to oil and/or gas production in the subsoil based on the geological analysis. The decision may include determining a production plan, for example by modification of an existing production plan. The determined production plan may comprise drilling one or more production wells and/or one or more injection wells, and/or then extracting oil—and/or gas, injecting a recovery enhancing product—e.g. steam or acid—, and/or performing a—e.g. hydraulic—fracturing. The location of the wells and/or parameters of the extraction/injection/fracturing may be determined based on the result of the geological analysis, for example to optimize production and/or a production versus risk ratio.

The expression "noise model" here designates any data structure that provides information relative to noise with respect to the 4D seismic signal. The noise model may correspond to one or more types of noise, meaning that the information is relative to said one or more types of noise. The one or more types of noise may comprise random noise and/or repeatability noise. The one or more types of noise may comprise random noise and repeatability noise, and optionally coherent noise.

A seismic data acquisition may as known per se be subject to different types of noise, e.g. including random noise, repeatability noise and/or coherent noise. Random noise, also referred to as ambient noise, designates the portion of noise which does not depend on parameters of the acquisition and thereby cannot be correlated to any such parameter. Random noise may notably be independent from seismic amplitude. Random noise corresponds to noise mostly linked to the environment and human related activities: e.g. swell, drag turbulences on streamers and interferences from production installations among other sources. Repeatability noise designates the portion of noise in the 4D seismic signal due to material conditions of the seismic data acquisitions not being perfectly repeatable, like seismic source position and power and/or as receivers' position. Due to the exact same conditions not being perfectly repeatable, repeatability noise appears in the 4D seismic signal. In the 4D seismic signal, repeatability noise correlates with any variable representative of seismic amplitude at a given time, such as base amplitude and/or monitor amplitude. Coherent noise designates the portion of noise linked to multiples (in the water layer or internal) and any elastic waves which are not primary reflections.

Identifying the part of the 4D seismic signal corresponding to a zone of the subsoil distinct from the zone subject to production may be performed in any way, for example comprising identifying said zone of the subsoil distinct from the zone subject to production and extracting the corresponding part of the 4D seismic signal. Determining the noise model may comprise considering at least a portion of the identified part of the 4D seismic signal as representative of noise. Since said portion corresponds to a zone of the subsoil not subject to any production, the method may consider that there is no significant geological evolution in the zone corresponding to said portion. The method may further consider that there is no evolution of the 3D seismic signals significantly distinct from noise for said zone. The method may thus interpret seismic attribute evolution in the part of the 4D seismic signal corresponding to said zone as being noise.

The noise model may comprise information describing how noise is added to the 4D seismic signal and/or any data corresponding to such information. The information describing how noise is added to the 4D seismic signal may comprise one or more noise probability distributions, e.g. each noise probability distribution describing how noise is added to one or more (e.g. the single one or all) attribute coordinates of the 4D seismic signal, for example a probability distribution for each of a plurality of values or ranges of one or more parameters related to the 4D seismic signal. In examples, each noise probability distribution may comprise, for a given value or range of the one or more parameters, a respective probability distribution for at least part of the one or more attributes of the 4D seismic signal. A probability distribution may be a discrete probability distribution assigning a respective probability to each of a set of attribute values or of attribute ranges, or alternatively a probability density function.

In examples, the attribute may be amplitude variation (i.e. difference—e.g. absolute difference—between monitor amplitude and base amplitude) and/or the parameter may be a variable representative of seismic amplitude at a given time, such as amplitude itself (e.g. base or monitor amplitude). In examples, determining the noise model may comprise determining at least a part of said one or more noise probability distributions, and optionally (i.e. should it be the case) inferring the other noise probability distributions therefrom.

The noise model may comprise or correspond to a confidence model. The confidence model may be any data structure that allows determining for each datum of at least part of the 4D seismic signal a confidence level that the datum is significantly distinct from one or more types of noise. In other words, the confidence model represents a function which outputs, for an inputted datum, a value representative of a confidence level (i.e. score) that the value of the datum is not substantially merely noise. Roughly speaking, the confidence model thereby allows understanding in the 4D seismic signal which data probably do not convey any other information than noise and which data probably convey more.

Each confidence level may be a value of a predetermined set of levels. The predetermined set may be continuous or discrete. The predetermined set may consist of two values (e.g. one corresponding to a lower level of confidence, such as 0, for example representing total absence of confidence, and the other one corresponding to a higher level of confidence, such as 1, for example representing total confidence). The predetermined set may alternatively comprise more than two values, for example forming a gradation of levels of confidence from 0 to 1 with a step size e.g. equal to 0.1.

The confidence model may correspond to one or more noise probability distributions considered for one or more attributes of the 4D seismic signal against one or more parameters related to the 4D seismic signal. In examples, the confidence levels of the confidence model may correspond to probability values, the probability values being computable based on the one or more noise probability distributions. For example, for a respective datum of the 4D seismic signal, the confidence level may be the probability that the value of noise is lower than the value of the attribute according to the one or more noise probability distributions.

The processing of the 4D seismic signal may comprise any dataflow and/or workflow that uses the noise model.

In examples, the processing may include filtering out data of the 4D seismic signal, for example if an attribute value is deemed not to be significantly distinct from noise based on the noise model. An attribute value may be deemed not to be significantly distinct from noise for example if it corresponds to a confidence level that it is distinct from noise below a predetermined threshold (e.g. which predetermined threshold may be higher than 0.7, 0.8, 0.9 or 0.95). Alternatively or additionally, the processing may include assigning confidence levels to results of any analysis performed based on the 4D seismic signal, for example corresponding to a level of confidence that a datum used in an analysis is deemed to be significantly distinct from noise based on the noise model.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

In examples, the providing of the 4D seismic signal and the identifying of the zone of the subsoil distinct from the zone subject to production may be performed via user-interaction. The noise model may then be determined fully automatically. The processing of the 4D seismic signal based on the noise model may then be performed fully automatically or via user-interaction (e.g. involving a geologist).

A typical example of computer-implementation is to perform the method with a system adapted for this purpose. The system may comprise a processor coupled to a memory, the memory having recorded thereon a computer program comprising instructions for performing the method. The memory may also store a database. The memory is any hardware adapted for such storage, possibly comprising several physical distinct parts (e.g. one for the program, and possibly one for the database).

Figure 1:
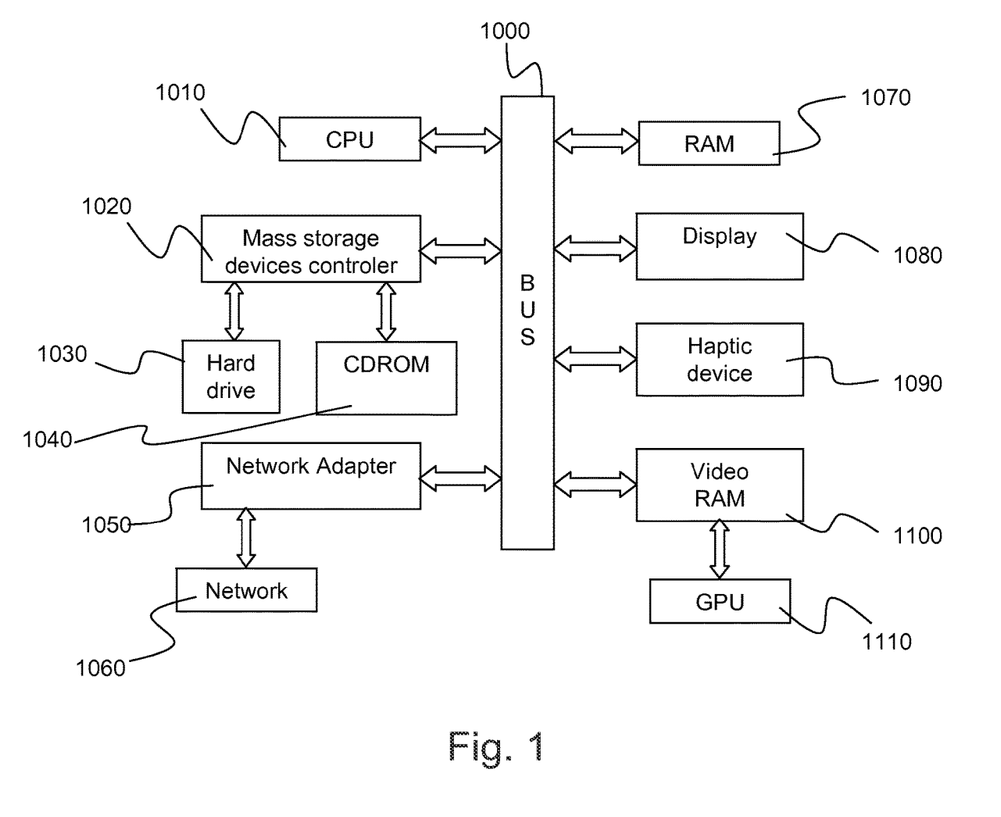
FIG. 1 shows an example of the system.

FIG. 1 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

Examples of identifying the part of the 4D seismic signal based on which the noise model is determined are now discussed.

In examples, a plurality of input zones of the subsoil distinct from the zone subject to production may be considered. The plurality of input zones may be identified by a user. The method may in examples then comprise controlling stationarity (i.e. space consistency) of the 4D seismic signal across the input zones in order to determine the noise model. The identification of the part of the 4D seismic signal based on which to determine the noise model may then be performed based on the result of the stationarity control. This improves accuracy of the determined noise model.

In examples, the control of stationarity may validate one or more of the input zones and be followed by an extension of one or more of the validated input zones before determining the noise model. The control of stationarity may be performed on relatively small input zones, in order to perform relatively fast. Then, one or more of the input zones validated by the control of stationarity may be extended (i.e. enlarged), in order to increase the quantity of data to determine the noise model. This allows increasing accuracy.

Each input zone is distinct from (i.e. out of) the zone subject to production and corresponds to a respective part of the 4D seismic signal. Since none of the input zones is subject to production, the method may consider that the corresponding parts of the 4D seismic signal should be merely representative of noise and thereby present characteristics related one with the other according to such fact. If this is the case, the method may then continue and directly determine the noise model (e.g. considering the union of the input zones, for example after extension of one or more of the input zones). If however this is not the case, the method may take any consequent measure before determining the noise model, for example rule out an inconsistent input zone (e.g. considering the union of the remaining input zones, for example after extension of one or more of the remaining input zones) and/or identify one or more other input zones not subject to production and to be based upon in order to determine the noise model (e.g. repeating the stationarity control with the new input zone(s) included to said new control).

The control of stationarity may be performed in any way. For example, the method may determine noise models each solely based on the part of the 4D seismic signal corresponding to a respective one of the input zones (e.g. according to a same predetermined scheme). Each such noise-model may be called "intermediary", since at this stage it is not necessarily to be used as such for the later processing of the 4D seismic signal. The method may then control stationarity across the intermediary noise models in any way (e.g. according to value of a predetermined similarity computation applied to the intermediary noise models), thereby verifying consistency of the intermediary noise models. The method may then establish the final noise model based on the intermediary noise models and on the result of said stationarity control. If the result of the stationarity control is positive, the method may for example select one of the intermediary noise models as the final noise model, or average the intermediary noise models. Alternatively, the method may re-run the scheme on the whole part of the 4D seismic signal corresponding to the union of the input zones, for example after extension of one or more of the remaining input zones. If the result of the stationarity control is negative, the method may rule out one or more of the intermediary noise models (e.g. based on any analysis) and/or determine new intermediary noise models based on new input zone(s) of the subsoil.

Alternatively or additionally to such stationarity control, the zone distinct from the zone subject to production and based on which the method determines the noise model may comprise or consist of one or more (e.g. at least substantially compact and/or convex) input zones, each input zone meeting one or more criteria that improve the accuracy of the noise model determined by the method. In case of a plurality of input zones, the method may or may not control stationarity across said input zones.

The method may comprise identifying as potential input zones one or more (e.g. at least substantially compact and/or convex) zones meeting any predetermined one or any predetermined combination of the one or more criteria (e.g. after providing said predetermined one or combination of the one or more criteria).

The following discusses examples of such criteria, which may be combined unless otherwise mentioned.

A first criterion for a candidate input zone may be to be located outside a reservoir or inside a reservoir but outside a zone of production of the reservoir. The subsoil may comprise an oil and/or gas reservoir comprising or consisting of the zone subject to production. The first alternative of the first criterion increases probability that the corresponding part of the 4D seismic signal only represents noise. The second alternative of the first criterion increases probability that when the corresponding part of the 4D seismic signal represents noise, it represents such noise accurately with respect to the zone subject to production (i.e. close to the actual noise that applies to the part of the 4D seismic signal corresponding to the zone subject to production).

A second criterion may be to have at least substantially the same or a similar depth as the zone subject to production. This allows the input zone present seismic characteristics relatively similar to the zone subject to production, notably in terms of signal attenuation. The depth of the input zone may for example be +/−10% or +/−5% relative to the depth of the zone subject to production. The depth of a zone may be the middle of the range of depths of all positions of the zone. The second criterion may for example to additionally be siding (i.e. aside or substantially aside) the zone subject to production. This allows keeping the seismic acquisition area coverage relatively small, for example restrained to the area corresponding to the zone subject to production plus the siding area corresponding to the input zone.

A third criterion alternative to the second criterion may be to be located above or under the zone subject to production. This means that the input zone is located at a different depth than the zone subject to production, but a part or all of the input zone is vertically above or under the zone subject to production. This allows keeping the seismic acquisition area coverage relatively small, for example restrained to the area corresponding to the zone subject to production. The third criterion may for example be to be located immediately above or immediately under the zone subject to production, e.g. with a distance from the zone subject to production higher than a value corresponding to the relevant seismic wavelet length but lower than a value corresponding to 10, 5 or 2 times said relevant seismic wavelet length. The minimum value allows to avoid any impact from the zone subject to protection. The maximum value allows a relatively small difference in seismic characteristics between the input zone and the zone subject to production, notably in terms of signal attenuation.

A fourth criterion may be to have a distance from the zone subject to production below a predetermined threshold. The distance may be the smallest Euclidian distance to link a position of the input zone with a position of the zone subject to production. The distance may alternatively be (notably in the case where the fourth criterion is combined with the second criterion) the smallest Euclidian distance to link a position of the surface projection (i.e. vertical projection on the 2D land or sea surface) of the input zone with a position of the surface projection of the zone subject to production. The predetermined threshold may for example in both cases be lower than 0.5, 0.3 or 0.1 times the diameter (i.e. largest length) of the zone subject to production or of its surface projection. The distance may alternatively be the difference between the depth of the input zone and the depth of the zone subject to production (notably when the fourth criterion is combined with the third criterion). The predetermined threshold may for example in such a case correspond to a value lower than 10, 5 or 3 times the relevant seismic wavelet length of the zone subject to production. The fourth criterion allows a relatively small difference in seismic characteristics between the input zone and the zone subject to production and/or keeping the seismic acquisition area coverage relatively small, for example restrained to the area encompassing the area corresponding to the zone subject to production and the area corresponding to the input zone.

A fifth criterion may be for the input zone to have at least substantially the same characteristics or similar seismic characteristics as the zone subject to production. The fifth criterion may possibly be met by meeting any one or more of the first four criteria. The fifth criterion may thus not necessarily be provided. Alternatively, the fifth criterion may be provided as such, in combination or not with any one or more of the first four criteria. The seismic characteristics may comprise bandwidth and/or energy of a 3D seismic signal outputted by a seismic acquisition performed on the input zone and the production zone. Similarity of such characteristics between the input zone and the zone subject to production may thus be assessed based on the 4D seismic signal. Two bandwidths may be considered as at least substantially the same or similar if relative difference between the minimal frequencies is below 5% or 10% (e.g. absolute difference below 5 Hz) and/or the relative difference between the maximal frequencies is below 5% or 10% (e.g. absolute difference below 5 Hz). Two energies may be considered as at least substantially the same or similar if relative difference between them is below 30%.

In all cases, a user may launch a module to identify the zone of the subsoil distinct from the zone subject to production for performance of the method. The user may then identify several input zones (e.g. whose union are intended to be inputted to the method). The identification may be performed graphically on a representation of the subsoil, or by entering space coordinates of boundaries of the input zones. Alternatively, the user may merely identify a unique input zone and the system may automatically generate sub-zones thereof, e.g. based on any predetermined rule. The user may then end the module, e.g. thereby triggering the rest of the method.

In examples applying to all cases, the zone of the subsoil distinct from the zone subject to extraction and/or injection eventually retained for determining the noise model may present a size corresponding to a number of seismic points higher than 100 000, 300 000 or 1 000 000. This allows determining a particularly accurate noise model.

An example of determining a noise model based on a part of the 4D seismic signal identified in any way described above is now discussed with reference to FIGS. 2-5. In this example, the noise model corresponds to one or more types of noise which at least comprise random noise and repeatability noise. The example is particularly efficient in terms of computing time and/or accuracy of the noise model obtained.

In the method of the example, determining the noise model comprises cross-representing (the identified part of) the 4D seismic signal against at least one parameter with which at least one of the one or more types of noise (e.g. repeatability noise) correlates. The noise model is then determined based on the cross-representation.

Figure 2:
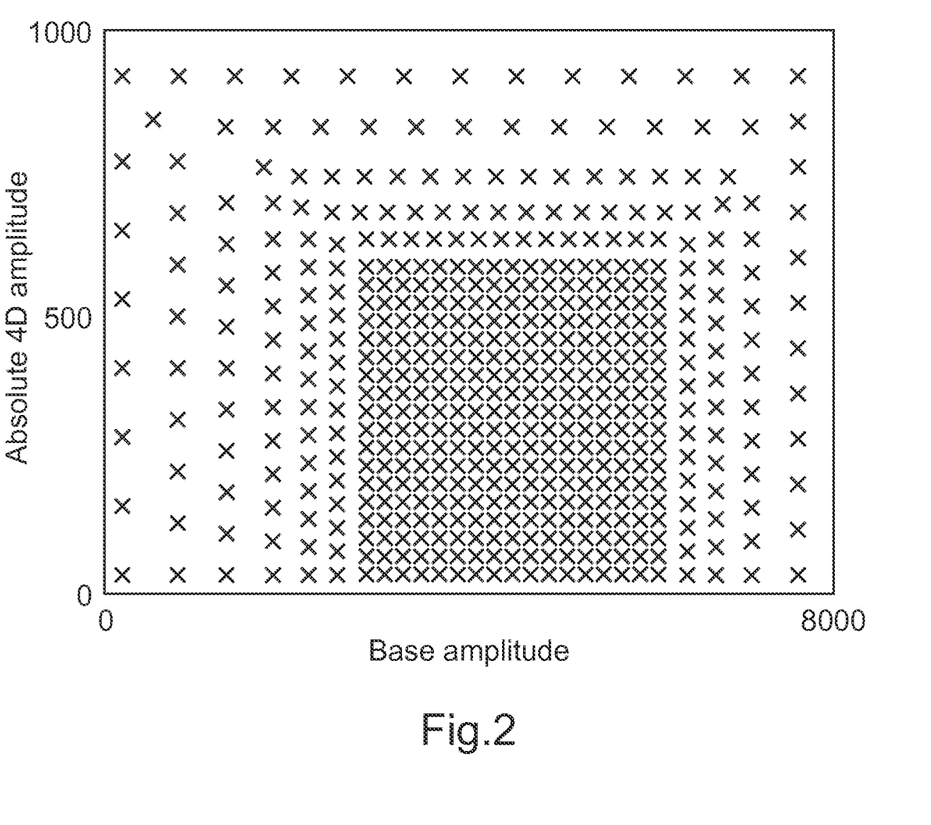
FIGS. 2-5 illustrate an example of determining a noise model.

FIG. 2 shows an example cross-plot 22 forming such a cross-representation. In this example, the 4D seismic signal is absolute 4D amplitude (i.e. variation of amplitude) between base time and monitor time. Absolute 4D amplitude is then cross-plotted against base amplitude. In other words, points 20 are represented in a cross-plot 22 with absolute 4D amplitude as the y-coordinate and base amplitude as the x-coordinate. Each point 20 represents a datum of the 4D seismic signal: with the value of the absolute 4D amplitude attribute of the datum as ordinate and the value of base amplitude for the datum as abscissa. Repeatability noise correlates with base amplitude, and this will be exploited efficiently by the method of the example.

Figure 3:
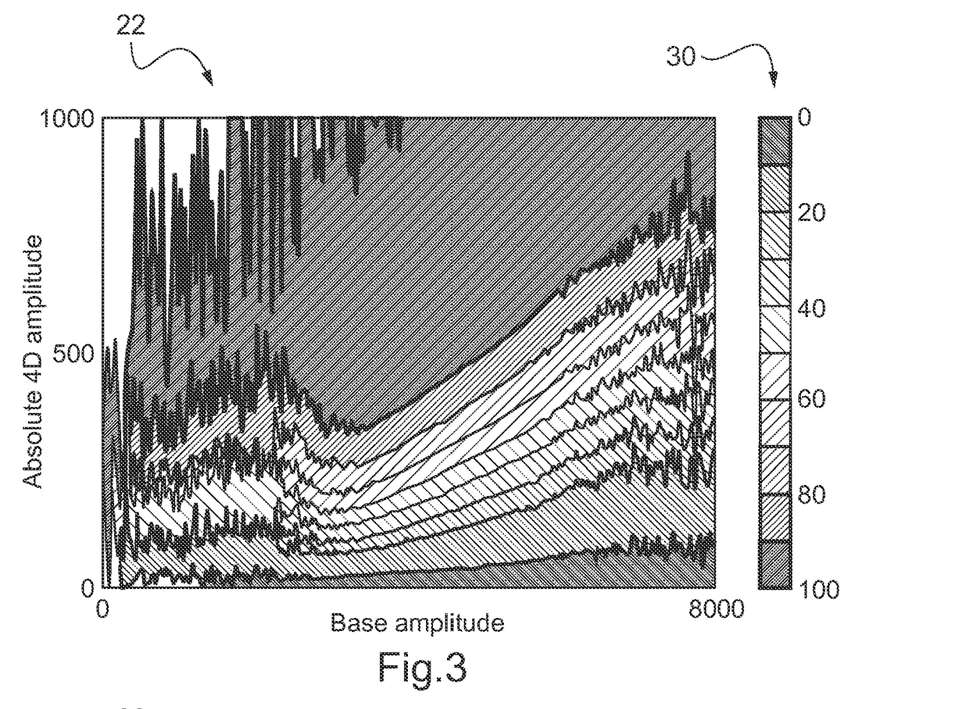

As illustrated by FIG. 3, the method of the example then comprises determining cumulative density levels 30 of columns in cross-plot 22. In other words, the cross-plot is divided in columns (e.g. of fixed width). Each column is then divided in (e.g. a fixed number of—e.g. 10) segments (representable by different colors on the figure), such that each segment contains a predetermined (e.g. and same) proportion (e.g. 10%) of all points 20 of the column. A segment corresponds to a cumulative density level 30 which corresponds to the proportion of all points 20 of the column within and under the segment.

At this point, cross-plot 22 already constitutes a noise model which may be outputted and efficiently exploited, since it has been obtained based on a zone of the subsoil distinct from the zone subject to production and thus where the 4D seismic signal is representative of noise. Each column of cross-plot 22 indeed constitutes a noise probability distribution for values of base amplitude falling within the range of said column. The segments of the column may be understood as each pointing to a respective range of values of noise in the absolute 4D seismic amplitude with a probability of 0.1 (or 10%). Then for example, for any datum observed in the 4D seismic signal and having a value of absolute 4D seismic amplitude and a base amplitude falling within the range of a column, the method may consider that the confidence level that the datum is distinct from noise corresponds to the proportion (i.e. cumulated density) of all points 20 of the column falling below the value of absolute 4D seismic amplitude.

The method of the example however goes further to output a refined noise model.

Figure 4:
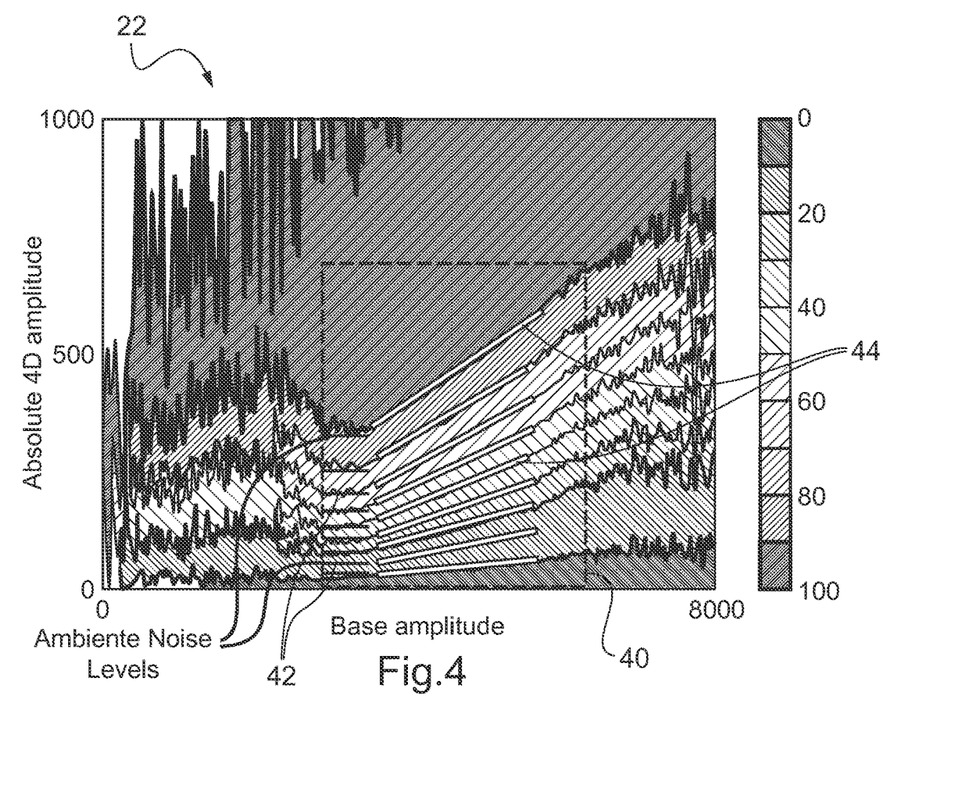

As illustrated by FIG. 4, in the method of the example, determining the noise model further comprises identifying a portion 40 of the domain of the cross-plot 22 for which the 4D seismic signal is statistically significant. In other words, the method determines a part of the cross-plot where the quantity of data is high enough for further processing (e.g. the density of points 20 is above a predetermined density threshold). The method may then infer the noise model based on such portion. Such refinement allows reaching a more robust noise model. As can be seen on the figures, outside portion 40 the data is scarce and the data inside portion 40 is thereby relatively more trustworthy.

As shown on FIG. 4, determining the noise model may comprise determining isocurves 42-44 (i.e. curve of isovalues) of cumulative density relative to the base amplitude, e.g. inside portion 40. Isocurves 42-44 correspond in the example to frontiers between the segments. As shown on FIG. 4, each isocurve comprises a horizontal line portion 42 and a linear slope portion 44. The horizontal line portion 42 is characteristic of an ambient noise level. The linear slope portion 44 is characteristic of a repeatability noise level, since repeatability noise in the represented 4D seismic signal is proportional with respect to base amplitude.

Figure 5:
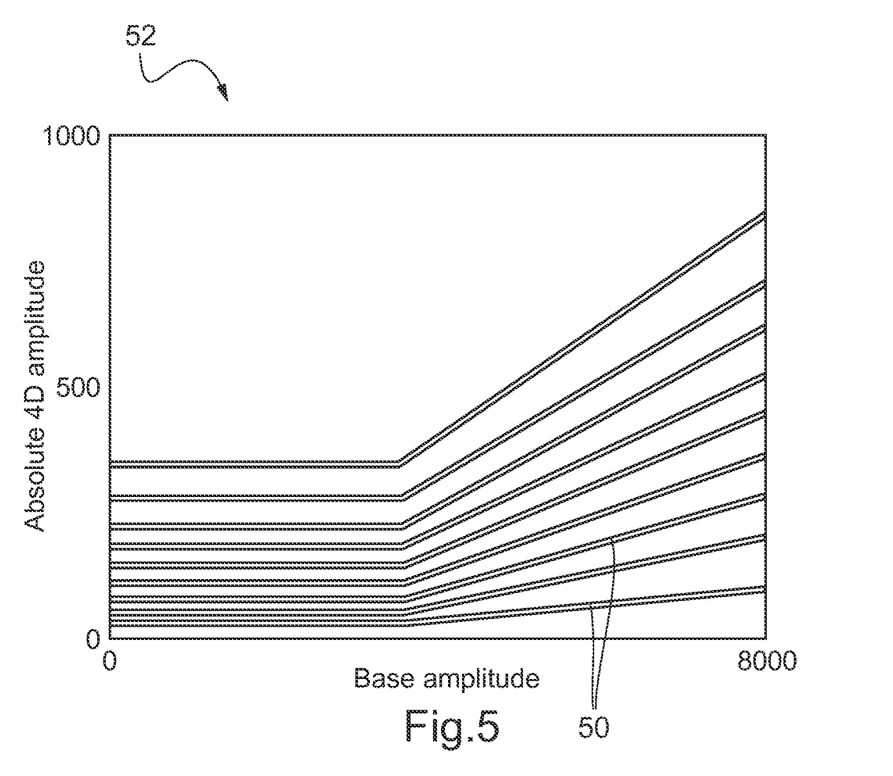

FIG. 5 shows the result of inferring the noise model 52. As shown on the figure, such inferring comprises extending the isocurves so as to obtain confidence level curves 50. Each curve 50 may then be considered as corresponding to a respective confidence level. The extending of a line may consist of continuing the line straightly. The result is thus a two-line-portions-curve, with a horizontal portion for low base amplitude values corresponding to amplitude levels where random noise is prevalent and a slope portion for higher amplitude values corresponding to amplitude levels where repeatability noise is added. The method of the example thereby allows determining a noise model 52 in a simple manner, considering that repeatability noise is proportional to amplitude.

The example thereby allows obtaining a noise model 52 which consists of a cross-plot representing a confidence model in the form of confidence level curves 50. Each datum of the 4D seismic signal may then be analyzed against noise model 52. The datum may be represented in the cross-plot of noise model 52 as a point having the base amplitude to which it corresponds as abscissa (x-coordinate) and the absolute 4D amplitude of the datum as ordinate (y-coordinate). The datum may then be assigned the confidence level corresponding to the level associated to the curve 50 immediately below the point. The method may then consider the datum as significantly distinct from at least random and repeatability noise with a corresponding confidence level.

Examples of application of the method where the zone subject to extraction and/or injection is a zone subject to production of oil and/or gas have been now discussed. The same principles however apply to any other type of zone of the subsoil subject to any extraction and/or injection of any material. For example, the zone subject to extraction and/or injection may be a zone subject to injection of material for storage by the subsoil. The material may comprise $CO_2$, and the method may be used within a $CO_2$ sequestration process. The material may comprise drill cuttings. The drill cuttings may stem from any drilling process, for example drilling an injection well or a production well.

The invention claimed is:

1. A computer-implemented method for processing a 4D seismic signal relative to a subsoil, the subsoil including a zone subject to extraction and/or injection, the method comprising:
   providing the 4D seismic signal, the 4D seismic signal stemming from seismic data acquisition using one or more seismic sources and one or more receivers, the 4D seismic signal representing evolution throughout the period of 3D seismic signals corresponding to one or more seismic attributes;
   identifying a part of the 4D seismic signal corresponding to a zone of the subsoil distinct from the zone subject to extraction and/or injection and for which there is no significant geological evolution and no evolution of the 3D seismic signals significantly distinct from noise;
   cross-representing the identified 4D seismic signal against at least one parameter with which at least one of the one or more types of noise correlates;
   determining a noise model of the 4D seismic signal based on the cross-representation;
   processing the 4D seismic signal based on the noise model; and
   determining a production plan for extraction of oil or gas based on the processed 4D seismic signal.

2. The method of claim 1, wherein identifying the part of the 4D seismic signal corresponding to a zone of the subsoil distinct from the zone subject to extraction and/or injection comprises controlling stationarity of the 4D seismic signal across a plurality of input zones of the subsoil distinct from the zone subject to extraction and/or injection.

3. The method of claim 1, wherein the zone of the subsoil distinct from the zone subject to extraction and/or injection comprises any one or any combination of input zones each:
   outside a reservoir, and/or inside a reservoir but outside a zone of production of the reservoir;
   having at least substantially the same or similar seismic characteristics as the zone subject to extraction and/or injection;
   having at least substantially the same or a similar depth as the zone subject to extraction and/or injection;
   having a distance from the zone subject to extraction and/or injection below a predetermined threshold; and
   siding, above and/or under the zone subject to extraction and/or injection.

4. The method of claim 1, wherein the noise model corresponds to one or more types of noise.

5. The method of claim 4, wherein the one or more types of noise comprise random noise and/or repeatability noise.

6. The method of claim 4, wherein determining the noise model comprises cross-representing the 4D seismic signal against at least one parameter with which at least one of the one or more types of noise correlates, the noise model being determined based on the cross-representation.

7. The method of claim 6, wherein determining the noise model further comprises determining isocurves of cumulative density relative to the at least one parameter.

8. The method of claim 6, wherein determining the noise model comprises:
   identifying a portion of the domain of the cross-representation for which the 4D seismic signal is statistically significant; and
   inferring the noise model based on the portion of the domain of the cross-representation for which the 4D seismic signal is statistically significant.

9. The method of claim 8, wherein inferring the noise model comprises determining, in the identified portion of the domain of the cross-representation, isocurves of cumulative density relative to the at least one parameter.

10. The method of claim 9, wherein inferring the noise model further comprises extending the isocurves.

11. The method of claim 7, wherein the isocurves each comprise a horizontal line portion and a linear slope portion.

12. The method of claim 6, wherein the at least one parameter is a parameter with which repeatability noise correlates.

13. The method of claim 12, wherein the at least one parameter is a variable representative of seismic amplitude at a given time.

14. A non-transitory computer readable medium having recorded thereon a computer program comprising instructions for performing a computer-implemented method for processing a 4D seismic signal relative to a subsoil, the subsoil including a zone subject to extraction and/or injection, the method comprising:
   providing the 4D seismic signal, the 4D seismic signal stemming from seismic data acquisition using one or more seismic sources and one or more receivers, the 4D seismic signal representing evolution throughout the period of 3D seismic signals corresponding to one or more seismic attributes;
   identifying a part of the 4D seismic signal corresponding to a zone of the subsoil distinct from the zone subject to extraction and/or injection and for which there is no significant geological evolution and no evolution of the 3D seismic signals significantly distinct from noise;

cross-representing the identified 4D seismic signal against at least one parameter with which at least one of the one or more types of noise correlates;

determining a noise model of the 4D seismic signal based on the cross-representation;

processing the 4D seismic signal based on the noise model; and determining a production plan for extraction of oil or gas based on the processed 4D seismic signal.

15. The computer readable medium of claim 14, wherein identifying the part of the 4D seismic signal corresponding to a zone of the subsoil distinct from the zone subject to extraction and/or injection comprises controlling stationarity of the 4D seismic signal across a plurality of input zones of the subsoil distinct from the zone subject to extraction and/or injection.

16. The computer readable medium of claim 14, wherein the zone of the subsoil distinct from the zone subject to extraction and/or injection comprises any one or any combination of input zones each:
    outside a reservoir, and/or inside a reservoir but outside a zone of production of the reservoir;
    having at least substantially the same or similar seismic characteristics as the zone subject to extraction and/or injection;
    having at least substantially the same or a similar depth as the zone subject to extraction and/or injection;
    having a distance from the zone subject to extraction and/or injection below a predetermined threshold; and/or
    siding, above and/or under the zone subject to extraction and/or injection.

17. A system comprising a processor coupled to a memory, the memory having recorded thereon a computer program comprising instructions for performing a computer-implemented method for processing a 4D seismic signal relative to a subsoil, the subsoil including a zone subject to extraction and/or injection, the method comprising:
    providing the 4D seismic signal, the 4D seismic signal stemming from seismic data acquisition using one or more seismic sources and one or more receivers, the 4D seismic signal representing evolution throughout the period of 3D seismic signals corresponding to one or more seismic attributes;
    identifying a part of the 4D seismic signal corresponding to a zone of the subsoil distinct from the zone subject to extraction and/or injection and for which there is no significant geological evolution and no evolution of the 3D seismic signals significantly distinct from noise;
    cross-representing the identified 4D seismic signal against at least one parameter with which at least one of the one or more types of noise correlates;
determining a noise model of the 4D seismic signal based on the cross-representation;
    processing the 4D seismic signal based on the noise model; and
    determining a production plan for extraction of oil or gas based on the processed 4D seismic signal.

18. The system of claim 17, wherein identifying the part of the 4D seismic signal corresponding to a zone of the subsoil distinct from the zone subject to extraction and/or injection comprises controlling stationarity of the 4D seismic signal across a plurality of input zones of the subsoil distinct from the zone subject to extraction and/or injection.

19. The system of claim 17, wherein the zone of the subsoil distinct from the zone subject to extraction and/or injection comprises any one or any combination of input zones each:
    outside a reservoir, and/or inside a reservoir but outside a zone of production of the reservoir;
    having at least substantially the same or similar seismic characteristics as the zone subject to extraction and/or injection;
    having at least substantially the same or a similar depth as the zone subject to extraction and/or injection;
    having a distance from the zone subject to extraction and/or injection below a predetermined threshold; and/or
    siding, above and/or under the zone subject to extraction and/or injection.

20. The system of claim 17, wherein the noise model corresponds to one or more types of noise.

* * * * *